(12) United States Patent
Jiang et al.

(10) Patent No.: US 12,349,071 B2
(45) Date of Patent: Jul. 1, 2025

(54) METHOD FOR POWER SAVING MODE SWITCHING, METHOD FOR POWER SAVING MODE CONFIGURATION, AND COMMUNICATIONS DEVICE

(71) Applicant: VIVO MOBILE COMMUNICATION CO., LTD., Guangdong (CN)

(72) Inventors: Dajie Jiang, Guangdong (CN); Xiaodong Shen, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 521 days.

(21) Appl. No.: 17/391,325

(22) Filed: Aug. 2, 2021

(65) Prior Publication Data

US 2021/0360532 A1 Nov. 18, 2021

Related U.S. Application Data

(63) Continuation of application No. PCT/CN2020/073190, filed on Jan. 20, 2020.

(30) Foreign Application Priority Data

Feb. 2, 2019 (CN) .................. 201910106905.X

(51) Int. Cl.
*H04W 52/02* (2009.01)
(52) U.S. Cl.
CPC .............. *H04W 52/0235* (2013.01)
(58) Field of Classification Search
CPC ......... H04W 52/0235; H04W 52/0212; H04W 76/28; H04W 68/02; H04W 76/27; H04W 52/0229; H04W 52/0209; H04W 52/0225; H04W 68/005; Y02D 30/70

USPC ...... 370/311; 455/418–420, 426.1, 458, 515, 455/574

See application file for complete search history.

(56) References Cited

U.S. PATENT DOCUMENTS

| | | | |
|---|---|---|---|
| 2012/0275364 | A1 | 11/2012 | Anderson et al. |
| 2014/0078948 | A1 | 3/2014 | Kwong et al. |
| 2016/0128128 | A1 | 5/2016 | Ang et al. |
| 2016/0128129 | A1* | 5/2016 | Kahtava ............... H04L 5/0055 370/311 |
| 2016/0266634 | A1* | 9/2016 | Chuang ................ G06F 1/3209 |
| 2017/0208523 | A1 | 7/2017 | Yang et al. |

(Continued)

FOREIGN PATENT DOCUMENTS

| | | |
|---|---|---|
| CN | 101272521 A | 9/2008 |
| CN | 103581884 A | 2/2014 |

(Continued)

OTHER PUBLICATIONS

Samsung, "On UE adaptation Schemes", 3GPP TSG RAN WGI Ad-Hoc Meeting 1901, RI-1901087, Taipei, Taiwan, Jan. 2ist-25, 2019.

(Continued)

*Primary Examiner* — Michael Y Mapa
(74) *Attorney, Agent, or Firm* — Price Heneveld LLP

(57) ABSTRACT

Embodiments of this disclosure provide a method for power saving mode switching, a method for power saving mode configuration, and a communications device. The method includes: switching the terminal from a first power saving mode to a second power saving mode when an event for power saving mode switching occurs.

20 Claims, 5 Drawing Sheets

(56) References Cited

U.S. PATENT DOCUMENTS

| | | | |
|---|---|---|---|
| 2017/0208619 A1 | 7/2017 | Yang et al. | |
| 2017/0353928 A1 | 12/2017 | Kim et al. | |
| 2018/0220345 A1 | 8/2018 | Moon et al. | |
| 2018/0324754 A1 | 11/2018 | Ryu et al. | |
| 2018/0367471 A1 | 12/2018 | Tang | |
| 2019/0223097 A1 | 7/2019 | Yi et al. | |
| 2021/0037473 A1 | 2/2021 | Liu | |
| 2021/0136805 A1* | 5/2021 | Yeo | H04W 72/535 |
| 2021/0344454 A1* | 11/2021 | Lee | H04L 5/0064 |
| 2022/0015035 A1* | 1/2022 | Choi | H04W 52/02 |
| 2022/0046540 A1* | 2/2022 | Kwon | H04W 52/0235 |
| 2022/0150829 A1* | 5/2022 | Yoon | H04W 52/0277 |

FOREIGN PATENT DOCUMENTS

| | | |
|---|---|---|
| CN | 103636264 A | 3/2014 |
| CN | 104023129 A | 9/2014 |
| CN | 104620667 A | 5/2015 |
| CN | 107529213 A | 12/2017 |
| CN | 108781415 A | 11/2018 |
| CN | 108886689 A | 11/2018 |
| CN | 109792691 A | 5/2019 |
| EP | 2073563 A1 | 6/2009 |
| EP | 3435696 A1 | 3/2017 |
| EP | 3823364 A1 | 3/2019 |
| EP | 3627910 A1 | 9/2019 |
| JP | 2015534347 A | 11/2015 |
| JP | 2019515532 A | 6/2019 |
| JP | 2019531034 A | 10/2019 |
| KR | 20190002440 A | 1/2019 |
| KR | 20190042112 A | 4/2019 |
| WO | 2008048071 A2 | 4/2008 |
| WO | 2011097766 A1 | 8/2011 |
| WO | 2012149319 A1 | 11/2012 |
| WO | 2014042573 A1 | 3/2014 |
| WO | 2017190358 A1 | 11/2017 |
| WO | 2018066923 A1 | 4/2018 |

OTHER PUBLICATIONS

Asustek, "Triggering adaptation of UE power consumption", 3GPP TSG RAN WG1 Ad-Hoc Meeting 1901, R1-1900816, Taipei, Taiwan, Jan. 21-25, 2019.

Huawei, "Considerations on 'wake-up signal' for eFeMTC", 3GPP TSG RAN WG1 Meeting #88bis, RI-1704282, Spokane, USA, Apr. 3-7, 2017.

CATT, "Offline Discussion on UE Power Saving Schemes", 3GPP TSG RAN WG1 Meeting #95, R1-1814327, Spokane, U.S.A., Nov. 12-16, 2018.

OPPO, "Triggering Adaptation of UE Power Consumption Characteristics", 3GPP TSG RAN WG1 Meeting #95, R1-1812825, Spokane, USA, Nov. 12-16, 2018.

Vivo, "Discussion on triggering adaptation of UE power consumption characteristics", 3GPP TSG RAN WG1 #95, R1-1812331, Spokane, USA, Nov. 1ih-16, 2018.

Vivo, "Discussion on UE adaptation to the traffic and UE power consumption characteristics", 3GPP TSG RAN WG1 Meeting #95, R1-1812330, Spokane, USA, Nov. 1ih-16, 2018.

ZTE, "Summary of email discussion [85bis#12][Joint/UEPCOP] Running stage-3 CRs", 3GPP TSG-RAN WG2 Meeting #86, R2-142350, Seoul, South Korea, May 19-23, 2014.

Vodafone, "Introduction of support for NB-IoT", SA WG2 Meeting #112, S2-154104, Nov. 16-20, 2015, Anaheim, USA.

Sony, "Power Consumption Triggering for NR", 3GPP TSG RAN WG1 Meeting AH1901, R1-1900381, Taipei, Taiwan, Jan. 21-25, 2019.

CATT, "UE Power saving schemes with power saving signal/channel/procedures", 3GPP TSG RAN WG1 Ad-Hoc Meeting 1901, R1-1900345, Taipei, Jan. 21-25, 2019.

ZTE Corporation, "Small correction to paging with wake up signal", 3GPP TSG-RAN2 Meeting #104, R2-1816864, Spokane, United States, Nov. 12, 2018-Nov. 16, 2018.

Qualcomm, "UE Power Saving during Active State", 3GPP TSG RAN WG2 NR #99bis, R2-1711904, Prague, Czech, Oct. 9-13, 2017.

Apple Inc., "Initial signals for NR-U", 3GPP TSG RAN WG1 Ad-Hoc Meeting 1901, R1-1900740, Taipei, Taiwan, Jan. 21-25, 2019.

ZTE, "On adaptation aspects for NR UE power consumption reduction", 3GPP TSG RAN WG1 Ad-Hoc Meeting 1901, R1-1900226, Taipei, Jan. 21-25, 2019.

Mediatek Inc., "Designs of Triggering Power Saving Adaptations", 3GPP TSG RAN WG1 Ad-Hoc Meeting 1901, R1-1900193, Taipei, Taiwan, Jan. 21-25, 2019.

* cited by examiner

METHOD FOR POWER SAVING MODE SWITCHING, METHOD FOR POWER SAVING MODE CONFIGURATION, AND COMMUNICATIONS DEVICE

CROSS-REFERENCE TO RELATED APPLICATIONS

This application is a continuation application of PCT Application No. PCT/CN2020/073190 filed on Jan. 20, 2020, which claims priority to Chinese Patent Application No. 201910106905.X filed in China on Feb. 2, 2019, the disclosures of which are incorporated herein by reference in their entireties.

TECHNICAL FIELD

Embodiments of this disclosure relate to the field of communications technologies, and specifically, to a method for power saving mode switching, a method for power saving mode configuration, and a communications device.

BACKGROUND

The new radio (NR) Release 15 (R15) standard specifies parameters associated with power saving of a terminal (for example, user equipment (UE)), for example, a bandwidth of a bandwidth part (BWP), the number of multiple-input multiple-output (MIMO) layers, and the number of downlink component carriers that are activated simultaneously. Values of the parameters associated with power saving lead to different power consumption of the terminal.

Parameters associated with power saving in the related art are configured in the following manner: A base station may directly or indirectly configure the parameters associated with power saving for a terminal. However, because there are a plurality of parameters associated with power saving, configuring all the parameters within short time causes high signaling overheads.

SUMMARY

One objective of embodiments of this disclosure is to provide a method for power saving mode switching, a method for power saving mode configuration, and a communications device, to resolve a problem of high overheads for configuring parameters associated with power saving for a terminal.

According to a first aspect in the embodiments of this disclosure, a method for power saving mode switching is provided, applied to a terminal, including:
  switching the terminal from a first power saving mode to a second power saving mode when an event for power saving mode switching occurs.

According to a second aspect in the embodiments of this disclosure, a method for power saving mode configuration is further provided, applied to a network device, including:
  transmitting configuration information for a power saving mode, where
  the configuration information includes one or more parameters corresponding to the power saving mode.

According to a third aspect in the embodiments of this disclosure, a terminal is further provided, including:
  a processing module, configured to switch the terminal from a first power saving mode to a second power saving mode when an event for power saving mode switching occurs.

According to a fourth aspect in the embodiments of this disclosure, a network device is further provided, including:
  a transmission module, configured to transmit configuration information for a power saving mode, where
  the configuration information includes one or more parameters corresponding to the power saving mode.

According to a fifth aspect in the embodiments of this disclosure, a communications device is further provided, including a processor, a memory, and a program stored in the memory and capable of running on the processor, where when the program is executed by the processor, the steps of the foregoing method for power saving mode switching are implemented, or the steps of the foregoing method for power saving mode configuration are implemented.

According to a sixth aspect in the embodiments of this disclosure, a computer-readable storage medium is further provided, where the computer-readable storage medium stores a computer program, and when the computer program is executed by a processor, the steps of the foregoing method for power saving mode switching are implemented, or the steps of the foregoing method for power saving mode configuration are implemented.

In the embodiments of this disclosure, power saving mode switching can be automatically triggered for a terminal when an event for power saving mode switching occurs, thereby reducing base station signaling, and reducing power consumption of the terminal or meeting performance requirements of the terminal.

BRIEF DESCRIPTION OF DRAWINGS

Other advantages and benefits become apparent to those of ordinary skill in the art by reading detailed descriptions of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

Figure 1:
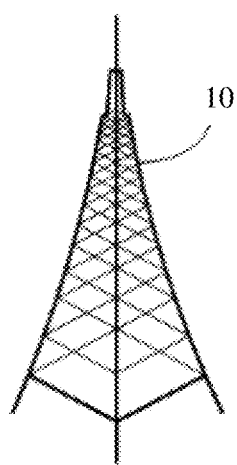
FIG. 1 is a schematic architectural diagram of a wireless communications system according to an embodiment of this disclosure.
Figure 1:
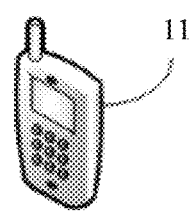

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects. For example, "A and/or B" indicates the following three cases: Only A, only B, or both A and B exist.

In the embodiments of this disclosure, terms such as "an example" or "for example" are used to represent examples, illustrations, or explanations. Any embodiment or design solution described as "an example" or "for example" in the embodiments of this disclosure should not be construed as being more preferred or advantageous than other embodiments or design solutions. Specifically, the term such as "an example" or "for example" is used to present related concepts in a specific manner.

For better understanding of the technical solutions in the embodiments of this disclosure, the following technical points are first described.

1. Cross-Slot Scheduling:

The NR R15 standard supports cross-slot scheduling. A principle of cross-slot scheduling is that there are N slots between a physical downlink control channel (PDCCH) and a physical downlink shared channel (PDSCH) or a physical uplink shared channel (PUSCH) scheduled by the PDCCH, where the PDSCH may be configured with K0 slots, the PUSCH may be configured with K2 slots, and K0 and K2 are configured by a base station and indicated by downlink control information (DCI). K0 indicates a time gap between the PDCCH and the PDSCH scheduled by the PDCCH; and K2 indicates a time gap between the PDCCH and the PUSCH scheduled by the PDCCH.

The advantage of cross-slot scheduling for the PDSCH is that UE does not need to buffer PDSCH data before decoding of the PDCCH; after decoding of the PDCCH, the UE receives the PDSCH data based on an indication of the PDCCH; and the UE can selectively switch on or off a radio frequency (RF) module and a base band (BB) module, thereby saving power.

2. Delay for PDSCH Processing of UE

NR supports two types of UE capabilities with different delays for PDSCH processing (N1): PDSCH processing capability 1 and PDSCH processing capability 2, and the two capabilities correspond to UE processing capability 1 and UE processing capability 2, respectively. The PDSCH processing capability 1 is a basic UE capability, while UE with the PDSCH processing capability 2 has a shorter delay for PDSCH processing.

3. Delay for PUSCH Preparation of UE

NR supports two types of UE capabilities with different delays for PUSCH preparation (N2): PUSCH delay capability 1 and PUSCH delay capability 2, and the two capabilities correspond to UE processing capability 1 and UE processing capability 2, respectively. The PUSCH delay capability 1 is a basic UE capability, while UE with PUSCH delay capability 2 has a shorter delay for PUSCH preparation.

4. Description of Parameters Associated with Power Saving:

Parameters associated with UE power saving in the NR R15 standard include:
the number of transmit antennas of a terminal;
the number of receive antennas of a terminal;
the number of uplink component carriers that are activated simultaneously (CC);
the number of simultaneously activated downlink CCs;
parameters K0, K1 or K2, where K0 indicates a time gap between a physical downlink control channel (PDCCH) and a physical downlink shared channel (PDSCH) scheduled by the PDCCH; K1 indicates a time gap between a PDSCH and an acknowledgment (ACK) message or a negative acknowledgment (NACK) message; and K2 indicates a time gap between a PDCCH and a physical uplink shared channel (PUSCH) scheduled by the PDCCH;
a delay for PDSCH processing (N1) or a delay for PUSCH preparation (N2);
a delay between receiving a channel state information reference signal (CSI-RS) configuration and reporting CSI by a terminal, or a delay between measuring CSI-RS and reporting CSI by a terminal;
the number of downlink multiple-input multiple-output (MIMO) layers;
the number of uplink MIMO layers;
a PDCCH monitoring periodicity, a PDCCH monitoring offset (offset), or PDCCH monitoring duration;
a bandwidth of a bandwidth part (BWP) or an identity (ID) of a BWP;
dual connectivity (DC) or non-dual connectivity (non-DC);
a maximum uplink rate or a maximum downlink rate;
the number of CSI reports or beam management reports simultaneously processed;
the number of measurement resources simultaneously received or processed; and
a delay associated with CSI report or a delay associated with beam management report.

In the embodiments of this disclosure, a power saving mode may include power saving mode 1, power saving mode 2, power saving mode 3, power saving mode 4, . . . , or the like, where parameters corresponding to the power saving modes and values of the parameters may be the same or may be different. It can be understood that a parameter corresponding to a power saving mode and value(s) of the parameter(s) are not specifically limited in the embodiments of this disclosure.

In the embodiments of this disclosure, a power saving level may include power saving level 1, power saving level 2, power saving level 3, power saving level 4, . . . , or the like, where parameters corresponding to the power saving levels and values of the parameters may be the same or may be different. It can be understood that a parameter corresponding to a power saving level and value(s) of the parameter(s) are not specifically limited in the embodiments of this disclosure.

The technologies described herein are not limited to 5G systems, subsequent evolved communications systems, and LTE/LTE advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system can implement radio technologies such as the global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies.

The following describes the embodiments of this disclosure with reference to the accompanying drawings. A method for power saving mode switching, a method for power saving mode configuration, and a communications device that are provided in the embodiments of this disclosure may be applied to a wireless communications system. FIG. 1 is a schematic architectural diagram of a wireless communications system according to an embodiment of this disclosure. As shown in FIG. 1, the wireless communications system may include a network device 10 and a terminal. The terminal is denoted as UE 11. The UE 11 may perform communication (signaling transmission or data transmission) with the network device 10. In practical applications, a connection between the above devices may be a wireless connection. For ease of visually representing the connection relationship between the devices, a solid line is used in FIG. 1. It should be noted that the communications system may include a plurality of UEs 11, and that the network device 10 may communicate with the plurality of UEs 11.

The terminal provided in this embodiment of this disclosure may be a mobile phone, a tablet computer, a notebook computer, an ultra-mobile personal computer (UMPC), a netbook, a personal digital assistant (PDA), a mobile internet device (MID), a wearable device, a vehicle-mounted device, or the like.

The network device 10 provided in this embodiment of this disclosure may be a base station. The base station may be a commonly used base station or an evolved node base station (eNB), or may be a network device in a 5G system (for example, a next generation node base station (gNB)), a transmission and reception point (TRP), or the like.

Figure 2:
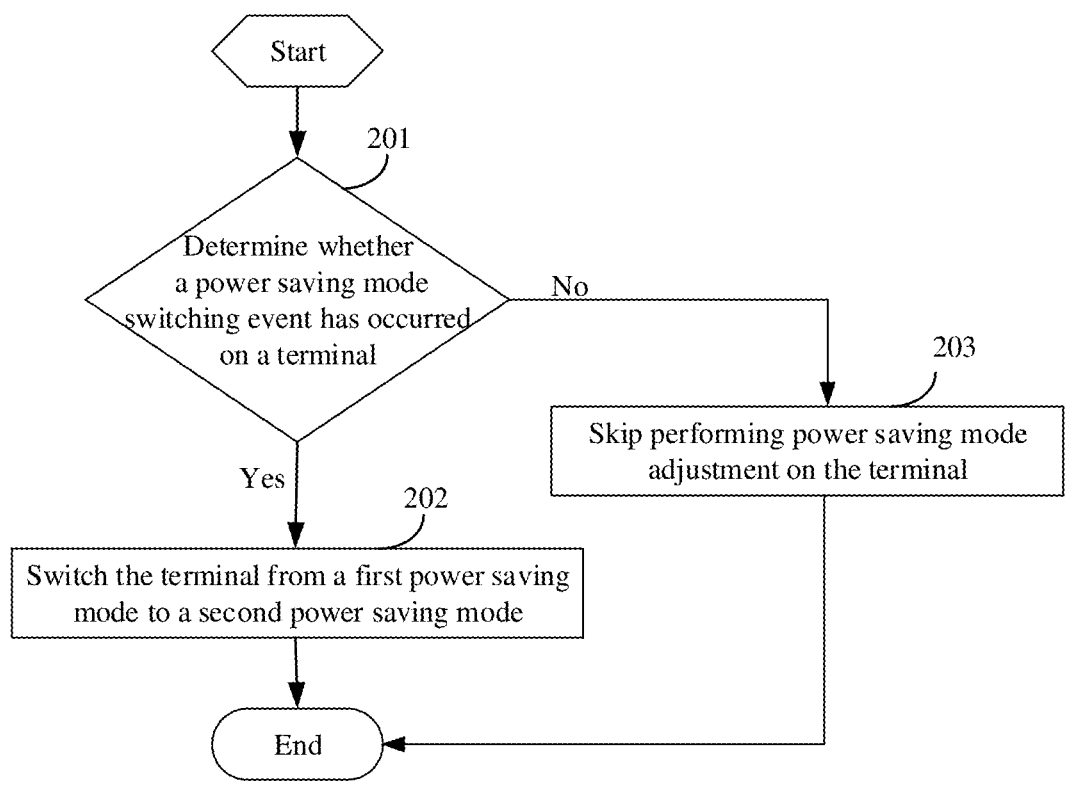
FIG. 2 is a flowchart of a method for power saving mode switching according to an embodiment of this disclosure.

Referring to FIG. 2, an embodiment of this disclosure provides a method for power saving mode switching. The method is performed by a terminal. Specific steps include step 201 to step 203.

Step 201: Determine whether a power saving mode switching event has occurred on the terminal; and perform step 202 when an event for power saving mode switching occurs; otherwise, perform step 203.

Step 202: Switch the terminal from a first power saving mode to a second power saving mode.

Step 203: Skip performing power saving mode adjustment on the terminal.

It can be understood that the first power saving mode corresponds to one or more parameters and a value of each parameter, and the second power saving mode corresponds to one or more parameters and a value of each parameter. The parameters may be associated with power consumption of the terminal, or the parameter may be associated with a power saving mode or a power saving level of the terminal. A value of at least one parameter of the first power saving mode is different from that of the second power saving mode.

Optionally, after step 202, the method in FIG. 2 may further include: reporting to a network side that the terminal has switched to the second power saving mode, for example, transmitting indication information to a network device, where the indication information indicates that the terminal has performed power saving mode switching.

In this embodiment of this disclosure, optionally, the occurrence of a power saving mode switching event includes one or more of the following:
(1) that a wake-up signal (WUS) is detected, where the WUS indicates that the terminal needs to monitor a physical downlink control channel (PDCCH) in a running period of a connected discontinuous reception (CDRX) on duration timer, where the WUS is received in the first power saving mode, and the WUS is associated with the PDCCH in the running period of the on duration timer;
(2) that a connected discontinuous reception-inactivity timer (CDRX-inactivity timer) is started;
(3) that scheduled information carried in a target PDCCH is not received within predetermined time in an active bandwidth part (BWP), where
optionally, cyclic redundancy check (CRC) of the target PDCCH is scrambled by a cell radio network temporary identifier (C-RNTI) or a configured scheduling radio network temporary identifier (CS-RNTI);
(4) that the terminal receives a paging message associated with the terminal;
(5) that a WUS received by the terminal indicates that the terminal needs to monitor a corresponding paging message, where the WUS is received in the first power saving mode, and the WUS is before a paging occasion (PO);
(6) that a WUS received by the terminal indicates that the terminal needs to monitor a corresponding paging message, and a paging message received is associated with the terminal, where both the WUS and the paging message are received in the first power saving mode, and the WUS is before a paging occasion PO;
(7) that the terminal is in a radio resource control (RRC) connected state but does not receive scheduled information carried in a PDCCH within predetermined time;
(8) that the terminal enters an idle state or an inactive state from an RRC connected state;
(9) that the terminal enters an RRC connected state from an idle state or an inactive state; (10) that the terminal detects an initial signal from a new radio unlicensed (NRU) system;
(11) that the terminal has transmitted information carried in a random access channel (RACH);
(12) that the terminal determines to transmit information carried in a RACH;
(13) that the terminal has transmitted a scheduling request (SR); and
(14) that the terminal determines to transmit an SR.

In this embodiment of this disclosure, optionally, the no occurrence of a power saving mode switching event includes one or more of the following:
(1) that no WUS is detected and it is determined that no power saving mode switching event has occurred, where the WUS indicates that the terminal does not need to monitor PDCCH in a running period of a CDRX on duration timer, the WUS is received in the first power saving mode, and the WUS is associated with the PDCCH in the running period of the on duration timer;

(2) that a CDRX-inactivity timer is not started;

(3) that scheduled information carried in a target PDCCH is received within predetermined time in an active BWP;

(4) that the terminal receives no paging message;

(5) that the terminal receives a paging message not associated with the terminal;

(6) that a WUS received by the terminal does not indicate the terminal to monitor a corresponding paging message;

(7) that the terminal receives no WUS for indicating the terminal to monitor a corresponding paging message;

(8) that a WUS received by the terminal indicates the terminal to monitor a corresponding paging message, but a paging message received is not associated with the terminal;

(9) that the terminal is in an RRC connected state and receives scheduled information carried in a PDCCH within predetermined time;

(10) that the terminal detects no initial signal from an NRU system;

(11) that the terminal is not to transmit information carried in a RACH; and

(12) that the terminal is not to transmit an SR.

In this embodiment of this disclosure, that the paging message is associated with the terminal may include at least one of the following:

information transmitted on a PDCCH or a physical downlink shared channel (PDSCH) for the paging message including information associated with an identity (ID) of the terminal, the paging message indicating system information update, the paging message indicating an earthquake and tsunami warning system (ETWS), and the paging message indicating a commercial mobile alarm system (CMAS).

In this embodiment of this disclosure, that the paging message is not associated with the terminal includes any one of the following:

the information transmitted on a PDCCH or PDSCH for the paging message excluding information associated with an ID of the terminal, the paging message indicating no system information update, the paging message indicating no ETWS, and the paging message indicating no CMAS.

In this embodiment of this disclosure, optionally, before step 201, the method in FIG. 2 further includes:

receiving configuration information for a power saving mode from a network side, where the configuration information includes one or more parameters corresponding to the power saving mode, and further, the configuration information may further include value(s) of the parameter(s).

In this embodiment of this disclosure, optionally, the configuration information includes: a first field, where a value of the first field corresponds to one or more first parameters, the first parameter is associated with power consumption of the terminal, and further, the value of the first field may further correspond to a value of the first parameter, that is, the value of the first field corresponds to the one or more first parameters and value(s) of the first parameter(s).

For example, the configuration information is two bits, and meanings thereof are shown in Table 1.

TABLE 1

First parameters associated with the first field and values of the first parameters

| First field | Parameter A | Parameter B | Parameter C |
|---|---|---|---|
| 00 | A1 | B1 | C1 |
| 01 | A2 | B2 | C2 |
| 10 | A3 | B2 | C3 |
| 11 | A3 | B2 | C4 |

The first parameter in Table 1 includes a parameter A, a parameter B, a parameter C, and values of the parameter A, the parameter B, and the parameter C, where the parameter A, the parameter B, and the parameter C are associated with power consumption of the terminal.

Optionally, the first parameter and the value of the first parameter may be configured by a network-side device or prescribed by a protocol.

In this embodiment of this disclosure, optionally, the configuration information includes: a second field, where a value of the second field corresponds to one or more second parameters, the second parameter is associated with a power saving mode or a power saving level of the terminal, and further, the value of the second field may further correspond to a value of the second parameter, that is, the value of the second field corresponds to the one or more second parameters and value(s) of the second parameter(s).

For example, the configuration information is two bits, and meanings thereof are shown in Table 2.

TABLE 2

Second parameters associated with the second field and values of the second parameters

| Second field | Power saving mode or power saving level | Parameter A | Parameter B | Parameter C |
|---|---|---|---|---|
| 00 | 1 | A1 | B1 | C1 |
| 01 | 2 | A2 | B2 | C2 |
| 10 | 3 | A3 | B2 | C3 |
| 11 | 4 | A3 | B2 | C4 |

Table 2 shows four power saving modes or power saving levels. Certainly, this is not limited. The fourth parameter may include a parameter A, a parameter B, a parameter C, and values of the parameter A, the parameter B, and the parameter C.

It can be understood that values of parameters corresponding to the power saving modes or power saving levels may be the same or may be different. For example, in Table 2, a value of the parameter A of the power saving mode (or power saving level) 3 is the same as a value of the parameter A of the power saving mode (or power saving level) 4; and a value of the parameter B of the power saving mode (or power saving level) 2 is the same as a value of the parameter B of the power saving mode (or power saving level) 3 and a value of the parameter B of the power saving mode (or power saving level) 4.

Optionally, the second parameter and the value of the second parameter may be configured by a network-side device or prescribed by a protocol. The second parameter is not described herein. For details, refer to the description of the first parameter.

In this embodiment of this disclosure, optionally, the configuration information includes: a third field, where the third field includes one or more bit strings, a value of each bit string corresponds to one third parameter, the third parameter is associated with power consumption of the terminal, and further, the value of the bit string further corresponds to a value of the third parameter, that is, the value of each bit string corresponds to one third parameter and a value of the third parameter.

For example, the configuration information may include the following field, where the field includes 12 bits (4 bits+5 bits+3 bits) in total, and meanings thereof are shown in Table 3.

TABLE 3

Third parameters associated with the third field and values of the third parameters

| Bit string of 4 bits, where different states of the bit string indicate different values of a parameter A | Bit string of 5 bits, where different states of the bit string indicate different values of a parameter B | Bit string of 3 bits, where different states of the bit string indicate different values of a parameter C |
| --- | --- | --- |

Optionally, the third parameter and the value of the third parameter may be configured by a network-side device or prescribed by a protocol.

In this embodiment of this disclosure, optionally, the first parameter, the second parameter, or the third parameter may include one or more of the following:

(1) the number of transmit antennas or transmit channels;
(2) the number of receive antennas or receive channels;
(3) uplink component carriers that are activated simultaneously, for example, indices of the uplink component carriers that are activated simultaneously, and/or the number of uplink component carriers that are activated simultaneously;
(4) downlink component carriers that are activated simultaneously (component carrier), for example, indices of the downlink component carriers that are activated simultaneously, and/or the number of downlink component carriers that are activated simultaneously;
(5) a time gap between a physical downlink control channel PDCCH and a physical downlink shared channel (PDSCH) scheduled by the PDCCH, for example, a parameter K0;
(6) a time gap between a PDSCH and an acknowledgment (ACK) or a negative acknowledgment (NACK);
(7) a time gap between a PDCCH and a physical uplink shared channel (PUSCH) scheduled by the PDCCH, for example, a parameter K2;
(8) a delay for PDSCH processing, for example, a parameter N1;
(9) a delay for PUSCH preparation, for example, a parameter N2;
(10) the maximum number of downlink MIMO layers; and
(11) the maximum number of uplink MIMO layers.

Further, the first parameter, the second parameter, or the third parameter may further include one or more of the following:

(1) an index of a configured control resource set (CORESET);
(2) an index of a configured search space;
(3) a PDCCH monitoring periodicity;
(4) a PDCCH monitoring offset;
(5) PDCCH monitoring duration;
(6) a bandwidth of a BWP;
(7) an identity ID of a BWP;
(8) a maximum uplink transmission rate;
(9) a maximum downlink transmission rate;
(10) a DRX cycle;
(11) a bandwidth of a BWP;
(12) the number of channel state information CSI reports simultaneously processed by the terminal;
(13) the number of beam management reports simultaneously processed by the terminal;
(14) the number of measurement resources simultaneously received or processed by the terminal;
(15) a delay associated with CSI report; and
(16) a delay associated with beam management report.

Optionally, the first parameter, the second parameter, or the third parameter may further include other DRX-associated parameters, such as an on duration timer parameter, an inactivity timer parameter, a long-period associated parameter, a short-period associated parameter, and a retransmission associated parameter.

Further, the CSI reports as in "the number of channel state information CSI reports (report) simultaneously processed by the terminal" may include a channel quality indicator (CQI), a precoding matrix indicator (PMI), a channel state information reference signal resource indicator (CRI), a synchronization signal/physical broadcast channel block resource indicator (SSBRI), a layer indicator (LI), a rank indicator (RI), a layer 1 reference signal received power (L1-RSRP), and/or the like.

Further, the beam management reports as in "the number of beam management reports simultaneously processed by the terminal" may include a CRI, RSRP, an SSBRI, and/or the like.

Further, the measurement resources as in "the number of measurement resources simultaneously received or processed by the terminal" may be at least one of the following: a CSI-RS resource, a synchronization signal/physical broadcast channel block (SSB) resource, a CSI-RS resource, and an SSB resource.

Further, the delay as in "a delay associated with CSI report" may include at least one of the following: a delay between time of receiving signaling by the terminal for triggering channel state information reference signal (CSI-RS) reporting and time of reporting corresponding CSI, and a delay between time of measuring a CSI-RS by the terminal and time of reporting corresponding CSI.

Further, the delay as in "a delay associated with beam management report" may include at least one of the following: a delay between time of receiving signaling by the terminal for triggering beam management reporting and time of reporting corresponding beam management, and a delay between time of measuring a CSI-RS by the terminal and time of reporting corresponding beam management.

In this embodiment of this disclosure, the terminal is switched from the first power saving mode to the second power saving mode when an event for power saving mode switching occurs, and power saving mode switching is skipped for the terminal when an event for power saving mode switching does not occur. In this way, power saving mode switching can be automatically triggered for the terminal when an event for power saving mode switching occurs, thereby reducing base station signaling, and reducing power consumption of the terminal or meeting performance requirements of the terminal.

Figure 3:
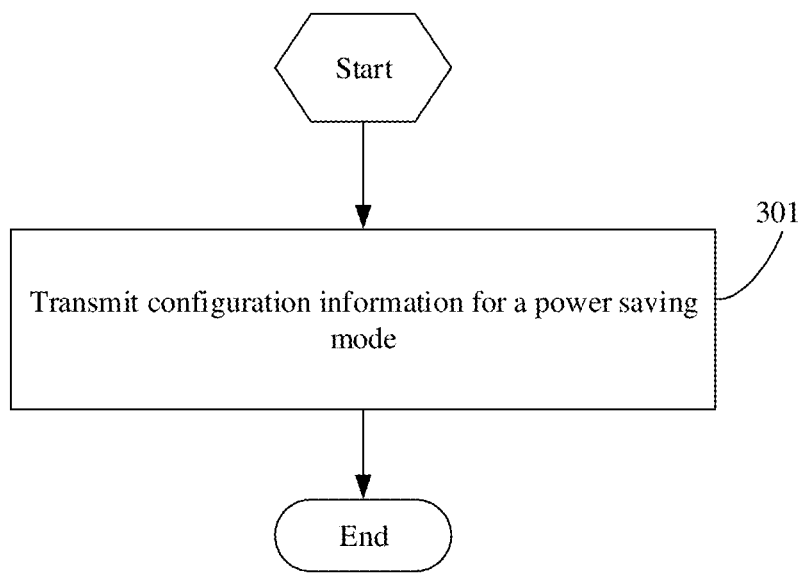
FIG. 3 is a flowchart of a method for power saving mode configuration according to an embodiment of this disclosure.

Referring to FIG. 3, an embodiment of this disclosure further provides a method for power saving mode configuration. The method is performed by a network device. A specific step includes step 301.

Step 301: Transmit configuration information for a power saving mode, where
the configuration information includes one or more parameters corresponding to the power saving mode, and further, the configuration information may further include value(s) of the parameter(s).

In this embodiment of this disclosure, optionally, after step 301, the method in FIG. 3 may further include: receiving indication information reported by a terminal, where the indication information indicates that the terminal has performed power saving mode switching, that is, the terminal has switched from a first power saving mode to a second power saving mode.

It should be noted that the power saving mode may include the first power saving mode and the second power saving mode. The first power saving mode corresponds to one or more parameters and a value of each parameter, and the second power saving mode corresponds to one or more parameters and a value of each parameter. The parameters may be associated with power consumption of the terminal, or the parameter may be associated with a power saving mode or a power saving level of the terminal. A value of at least one parameter of the first power saving mode is different from that of the second power saving mode.

It should be noted that for the description of the configuration information, reference may be made to the description of the configuration information in the embodiment in FIG. 3. Details are not repeated herein.

In this embodiment of this disclosure, the network device may configure the first power saving mode and the second power saving mode of the terminal, power saving mode switching can be automatically triggered for the terminal when an event for power saving mode switching occurs, thereby reducing base station signaling, and reducing power consumption of the terminal or meeting performance requirements of the terminal.

Embodiment 1: Connected Discontinuous Reception (CDRX) with a Wake-Up Signal (WUS)

Scenario: A WUS exists before or when a CDRX on duration timer (on duration timer) is running, and UE performs WUS detection. The WUS indicates whether the UE monitors a PDCCH in a running period of the on duration timer. Based on a WUS detection result, the UE monitors or does not monitor the PDCCH in the running period of the on duration timer.

For example, in CDRX, the UE receives a WUS in a first power saving mode. If the WUS indicates that the UE needs to monitor the PDCCH in a running period of the on duration timer, the UE is triggered to switch to a second power saving mode. Otherwise, switching to a second power saving mode is skipped (that is, the first power saving mode is maintained).

Further, optionally, after the UE has switched to the second power saving mode, it is reported to a gNB that the UE has switched to the second power saving mode.

Embodiment 2: CDRX without a WUS

Scenario: In a running period of CDRX on duration timer, UE monitors a PDCCH, and if the UE receives scheduled information carried in the PDCCH, the UE starts a connected discontinuous reception-inactivity timer (CDRX-inactivity timer), and continues monitoring the PDCCH. Otherwise, the UE enters a discontinuous reception (DRX) off after the on duration timer expires.

For example, in a running period of the on duration timer, if the CDRX-inactivity timer is not started, the UE works in a first power saving mode; or if the CDRX-inactivity timer is started, the UE is triggered to switch to the second power saving mode.

Further, optionally, after the UE has switched to the second power saving mode, it is reported to a gNB that the UE has switched to the second power saving mode.

Embodiment 3: Default BWP

Scenario: In an RRC active state, if UE does not receive scheduled information carried in a PDCCH in a running period of a given timer (timer) in an active BWP, the UE switches to a default BWP.

For example, in the RRC active state, if the UE works in a first power saving mode, but the UE does not receive scheduled information carried in the PDCCH in the running period of the given timer in the active BWP, the UE switches to the default BWP, and the UE is triggered to switch to a second power saving mode. For example, in the second power saving mode, there are fewer antennas used, such as 2 receive antennas (2 Rx), while in the first power saving mode of the UE in the active BWP, there are 4 receive antennas (4 Rx) used; otherwise, the first power saving mode is maintained.

Embodiment 4: Paging in RRC Idle/Active Mode

Scenario: In an RRC idle or active mode, a terminal monitors a paging message at regular intervals, where the paging message indicates system information (SI) update, incoming downlink data, or the like to the terminal.

For example, the UE receives a paging message in a first power saving mode. If the paging message indicates that a system has paged the UE, the UE is triggered to switch to a second power saving mode to receive subsequent information; otherwise, the first power saving mode is maintained.

For example, the UE receives a paging message in a first power saving mode. If the paging message indicates that a system has paged the UE for a reason other than system information update, the UE is triggered to switch to a second power saving mode; otherwise, the first power saving mode is maintained.

Embodiment 5: Paging in RRC Idle/Active Mode with WUS

Scenario: In an RRC idle/active mode, UE monitors a WUS before a paging occasion (PO) at regular intervals (for example, in each paging cycle), where the WUS indicates whether the UE needs to monitor a corresponding paging message.

For example, if the UE receives the WUS before the PO in a first power saving mode, and if the WUS indicates that the UE needs to monitor the corresponding paging message, the UE is triggered to switch to a second power saving mode to receive the paging message. Otherwise, switching to a second power saving mode is skipped.

For example, if the UE receives the WUS before the PO in a first power saving mode, the WUS indicates that the UE needs to monitor the corresponding paging message, the UE receives the corresponding paging message in the first power saving mode, and the paging message is associated with the UE (that is, the paging message indicates that a system has paged the UE), the UE is triggered to switch to a second power saving mode to receive subsequent information; otherwise, the first power saving mode is maintained.

For example, if the UE receives the WUS before the PO in a first power saving mode, the WUS indicates that the UE needs to monitor the corresponding paging message, the UE receives the corresponding paging message in the first power saving mode, and the paging message is associated with the UE but a paging reason is not system information update, the UE is triggered to switch to a second power saving mode to receive subsequent information; otherwise, the first power saving mode is maintained.

Embodiment 6: Timer Based

For example, if UE is in an RRC connected state and configured with a second power saving mode, but does not receive scheduled information carried in a PDCCH in a running period of a preset timer or a timer configured by a base station, the UE is triggered to switch to a first power saving mode to receive subsequent information; otherwise, the second power saving mode is maintained.

Embodiment 7: State Triggered

For example, if UE is in an RRC connected state and configured with a second power saving mode, and the UE enters an idle state or inactive state, the UE is triggered to switch to a first power saving mode to receive subsequent information; otherwise, the second power saving mode is maintained.

For example, if UE is in an idle state or inactive state and configured with a first power saving mode, and the UE enters an RRC connected state, the UE is triggered to switch to a second power saving mode to receive subsequent information; otherwise, the first power saving mode is maintained.

Embodiment 8: Initial Signal from a New Radio Unlicensed (NRU) System

For example, in an NRU system, if a base station configures a first power saving mode or UE works in a first power saving mode, and the UE detects an initial signal, the UE is triggered to switch to a second power saving mode; and if the UE detects no initial signal, the first power saving mode is maintained.

Embodiment 9: Transmitting Information Carried in a Random Access Channel (RACH) by UE in Uplink For example, if a base station configures a first power saving mode for UE or UE works in a first power saving mode, after the UE has transmitted information carried in a RACH or the UE determines to transmit information carried in a RACH, the UE switches to a second power saving mode; otherwise, the first power saving mode is maintained.

Embodiment 10: Transmitting Scheduling Request (SR) by UE

For example, if a base station configures a first power saving mode for UE or UE works in a first power saving mode, after the UE has transmitted an SR or the UE determines to transmit an SR, the UE switches to a second power saving mode; otherwise, the first power saving mode is maintained.

An embodiment of this disclosure further provides a terminal. Because a problem-resolving principle of the terminal is similar to that of the method for power saving mode switching in the embodiments of this disclosure, for implementation of the terminal, reference may be made to the implementation of the method. Details are not described herein again.

Figure 4:
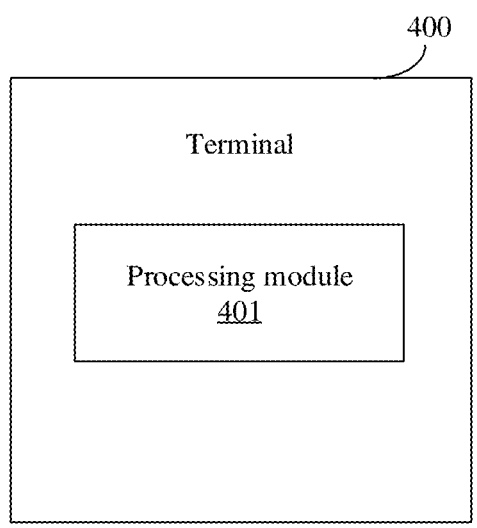
FIG. 4 is a first structural diagram of a terminal according to an embodiment of this disclosure.

Referring to FIG. 4, an embodiment of this disclosure further provides a terminal. The terminal 400 includes:
a processing module 401, configured to switch the terminal from a first power saving mode to a second power saving mode when an event for power saving mode switching occurs.

In this embodiment of this disclosure, optionally, the terminal 400 may further include: a reporting module, configured to report to a network side that the terminal has switched to the second power saving mode.

In this embodiment of this disclosure, optionally, the occurrence of a power saving mode switching event includes one or more of the following:
that a WUS is detected, where the WUS indicates that the terminal needs to monitor PDCCH in a running period of a CDRX on duration timer, where the WUS is received in the first power saving mode, and the WUS is associated with the PDCCH in the running period of the on duration timer;
that a CDRX-inactivity timer is started;
that scheduled information carried in a target PDCCH is not received within predetermined time in an active BWP;
that the terminal receives a paging message associated with the terminal;
that a WUS received by the terminal indicates that the terminal needs to monitor a corresponding paging message, where the WUS is received in the first power saving mode, and the WUS is before a PO;
that a WUS received by the terminal indicates that the terminal needs to monitor a corresponding paging message, and a paging message received is associated with the terminal, where both the WUS and the paging message are received in the first power saving mode, and the WUS is before a PO;
that the terminal is in an RRC connected state but does not receive scheduled information carried in a PDCCH within predetermined time;
that the terminal enters an idle state or an inactive state from an RRC connected state;
that the terminal enters an RRC connected state from an idle state or an inactive state;
that the terminal detects an initial signal from an NRU system;
that the terminal has transmitted information carried in a RACH;
that the terminal determines to transmit information carried in a RACH;
that the terminal has transmitted an SR; and
that the terminal determines to transmit an SR.

In this embodiment of this disclosure, optionally, the processing module 401 is further configured to skip performing power saving mode switching on the terminal when an event for power saving mode switching does not occur.

In this embodiment of this disclosure, optionally, the no occurrence of a power saving mode switching event includes one or more of the following:
that no WUS is detected and it is determined that no power saving mode switching event has occurred, where the WUS indicates that the terminal does not need to monitor PDCCH in a running period of a CDRX on duration timer, the WUS is received in the first power saving mode, and the WUS is associated with the PDCCH in the running period of the on duration timer;

that a CDRX-inactivity timer is not started;

that scheduled information carried in a target PDCCH is received within predetermined time in an active BWP;

that the terminal receives no paging message;

that the terminal receives a paging message not associated with the terminal;

that a WUS received by the terminal does not indicate the terminal to monitor a corresponding paging message;

that the terminal receives no WUS for indicating the terminal to monitor a corresponding paging message;

that a WUS received by the terminal indicates the terminal to monitor a corresponding paging message, but a paging message received is not associated with the terminal;

that the terminal is in an RRC connected state and receives scheduled information carried in a PDCCH within predetermined time;

that the terminal detects no initial signal from an NRU system;

that the terminal is not to transmit information carried in a RACH; and that the terminal is not to transmit an SR.

In this embodiment of this disclosure, optionally, the terminal further includes: a first receiving module, configured to receive configuration information for a power saving mode (for example, a first power saving mode and a second power saving mode) from a network side, where the configuration information includes one or more parameters corresponding to the power saving mode, and further, the configuration information further includes value(s) of the parameter(s).

In this embodiment of this disclosure, optionally, the configuration information includes one or more of the following:

a first field, where a value of the first field corresponds to one or more first parameters, and the first parameter is associated with power consumption of the terminal;

a second field, where a value of the second field corresponds to one or more second parameters, and the second parameter is associated with a power saving mode or a power saving level of the terminal; and a third field, where the third field includes one or more bit strings, and a value of each bit string corresponds to one third parameter, and the third parameter is associated with power consumption of the terminal.

In this embodiment of this disclosure, optionally, the value of the first field further corresponds to a value of the first parameter.

In this embodiment of this disclosure, optionally, the value of the second field further corresponds to a value of the second parameter.

In this embodiment of this disclosure, optionally, the value of the third field further corresponds to a value of the third parameter.

In this embodiment of this disclosure, optionally, the first parameter, the second parameter, or the third parameter includes one or more of the following:

the number of transmit antennas or transmit channels;

the number of receive antennas or receive channels;

uplink component carriers that are activated simultaneously;

downlink component carriers that are activated simultaneously;

a time gap between a physical downlink control channel PDCCH and a physical downlink shared channel PDSCH scheduled by the PDCCH;

a time gap between a PDSCH and an acknowledgment ACK or a negative acknowledgment NACK;

a time gap between a PDCCH and a physical uplink shared channel PUSCH scheduled by the PDCCH;

a delay for PDSCH processing;

a delay for PUSCH preparation;

the maximum number of downlink multiple-input multiple-output MIMO layers; and the maximum number of uplink MIMO layers.

In this embodiment of this disclosure, optionally, the first parameter, the second parameter, or the third parameter may further include one or more of the following:

an index of a configured CORESET;

an index of a configured search space;

a PDCCH monitoring periodicity;

a PDCCH monitoring offset;

PDCCH monitoring duration;

a bandwidth of a BWP;

an identity ID of a BWP;

a maximum uplink transmission rate;

a maximum downlink transmission rate;

a DRX cycle;

a bandwidth of a BWP;

the number of CSI reports simultaneously processed by the terminal;

the number of beam management reports simultaneously processed by the terminal;

the number of measurement resources simultaneously received or processed by the terminal;

a delay associated with CSI report; and a delay associated with beam management report.

It can be understood that values of at least one of the first parameter, the second parameter, or the third parameter of the first power saving mode and the second power saving mode are different.

The terminal provided in this embodiment of this disclosure can perform the foregoing method embodiment, with a similar implementation principle and similar technical effects. Details are not described herein again in this embodiment.

An embodiment of this disclosure further provides a network device. Because a problem-resolving principle of the network device is similar to that of the method for power saving mode configuration in the embodiments of this disclosure, for implementation of the network device, reference may be made to the implementation of the method. Details are not described herein again.

Figure 5:
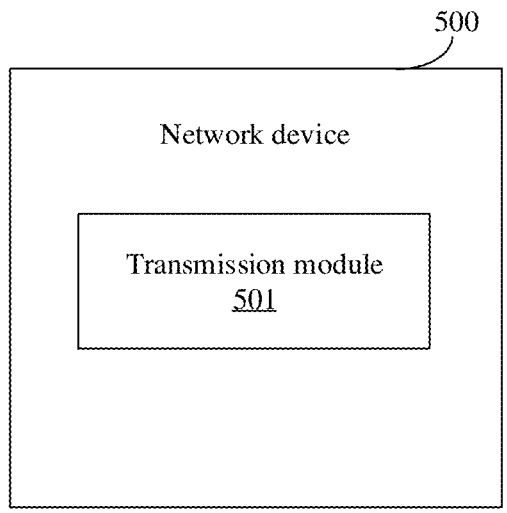
FIG. 5 is a first structural diagram of a network device according to an embodiment of this disclosure.

Referring to FIG. 5, an embodiment of this disclosure further provides a network device, where the network device 500 includes:

a transmission module 501, configured to transmit configuration information for a power saving mode, where the configuration information includes one or more parameters corresponding to the power saving mode, and further, the configuration information may further include value(s) of the parameter(s).

In this embodiment of this disclosure, optionally, the network device 500 further includes: a second receiving module, configured to receive indication information reported by a terminal, where the indication information indicates that the terminal has performed power saving mode switching, that is, the terminal has switched from a first power saving mode to a second power saving mode.

It should be noted that the power saving mode may include the first power saving mode and the second power saving mode. The first power saving mode corresponds to one or more parameters and a value of each parameter, and the second power saving mode corresponds to one or more parameters and a value of each parameter. The parameters may be associated with power consumption of the terminal, or the parameter may be associated with a power saving mode or a power saving level of the terminal.

It can be understood that a value of at least one parameter of the first power saving mode is different from that of the second power saving mode.

It should be noted that for the description of the configuration information, reference may be made to the description of the configuration information in the embodiment in FIG. 4. Details are not repeated herein.

The network device provided in this embodiment of this disclosure can perform the foregoing method embodiment, with a similar implementation principle and similar technical effects. Details are not repeated herein in this embodiment.

Figure 6:
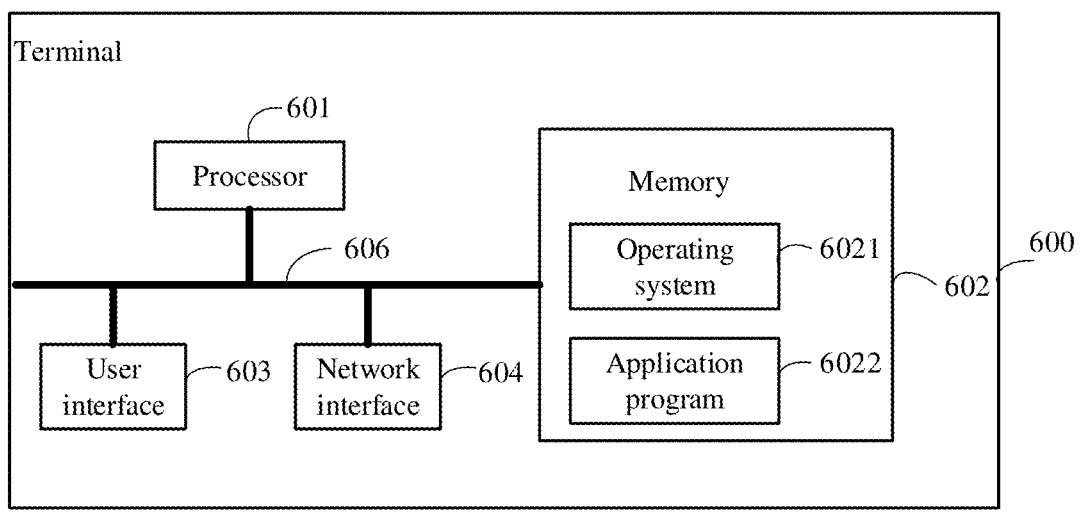
FIG. 6 is a second structural diagram of a terminal according to an embodiment of this disclosure.

As shown in FIG. 6, a terminal 600 in FIG. 6 includes at least one processor 601, a memory 602, at least one network interface 604, and a user interface 603. The components of the terminal 600 are coupled together through a bus system 605. It can be understood that the bus system 605 is used to implement connection and communication between these components. In addition to a data bus, the bus system 605 further includes a power bus, a control bus, and a status signal bus. However, for clarity of description, various buses are denoted as the bus system 605 in FIG. 6.

The user interface 603 may include a display, a keyboard, or a pointing device (for example, a mouse, a trackball, a touch panel, or a touchscreen).

It can be understood that the memory 602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 602 of the system and the method described in the embodiments of this disclosure is intended to include but not be limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player and a browser, which are used to implement various application services. A program for implementing the method in the embodiments of this disclosure may be included in the application program 6022.

In an embodiment of this disclosure, when a program or an instruction stored in the memory 602, which may be specifically a program or an instruction stored in the application program 6022, is invoked, the following step is implemented during execution: switching the terminal from a first power saving mode to a second power saving mode when an event for power saving mode switching occurs.

The terminal provided in this embodiment of this disclosure can perform the foregoing method embodiment, with a similar implementation principle and similar technical effects. Details are not described herein again in this embodiment.

Figure 7:
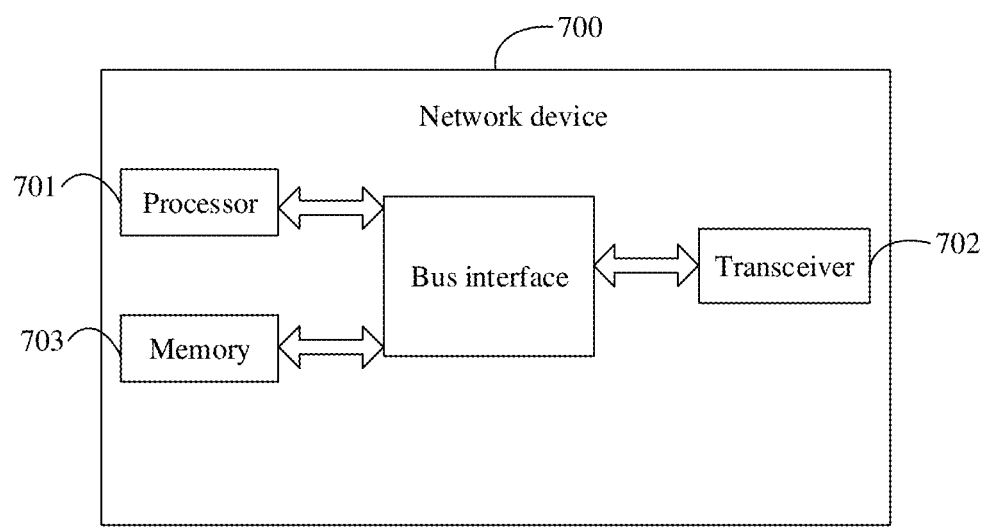
FIG. 7 is a second structural diagram of a network device according to an embodiment of this disclosure.

Referring to FIG. 7, an embodiment of this disclosure provides a network device 700, including a processor 701, a transceiver 702, a memory 703, and a bus interface.

The processor 701 may be responsible for bus architecture management and general processing. The memory 703 may store data that the processor 701 uses when performing an operation.

In this embodiment of this disclosure, the network device 700 may further include a computer program stored in the memory 703 and capable of running on the processor 701.

In an embodiment of this disclosure, the following is implemented when the computer program is executed by the processor 701: transmitting configuration information for a power saving mode (for example, a first power saving mode and a second power saving mode), where the configuration information includes one or more parameters corresponding to the power saving mode, and further, the configuration information may further include value(s) of the parameter(s).

In FIG. 7, a bus architecture may include any number of interconnected buses and bridges, and specifically connect together various circuits of one or more processors represented by the processor 701 and a memory represented by the memory 703. The bus architecture may further connect various other circuits such as a peripheral device, a voltage regulator, and a power management circuit. These are all well known in the art, and therefore are not further described in this embodiment of this disclosure. The bus interface provides an interface. The transceiver 702 may be a plurality of elements, including a transmitter and a receiver, and provides units configured to communicate with various other apparatuses over a transmission medium.

The network device provided in this embodiment of this disclosure can perform the foregoing method embodiment, with a similar implementation principle and similar technical effects. Details are not repeated herein in this embodiment.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, so that the processor can read information from the storage medium and write information into the storage medium. Certainly, the storage medium may be a component of the processor. The processor and the storage medium may be included in an ASIC. In addition, the ASIC may be included in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any usable medium accessible to a general-purpose or special-purpose computer.

The objectives, technical solutions, and beneficial effects of this disclosure are further described in detail in the foregoing specific embodiments. It should be understood that the foregoing descriptions are merely specific embodiments of this disclosure, and are not intended to limit the protection scope of this disclosure. Any modification, equivalent replacement, improvement, or the like made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Apparently, a person skilled in the art may make various changes and variations to the embodiments of this disclosure without departing from the spirit and scope of this disclosure. Therefore, this disclosure is intended to cover the changes and variations provided that the changes and variations of the embodiments of this disclosure fall within the scope of the claims of this disclosure or equivalent technologies thereof

What is claimed is:

1. A method for power saving mode switching, applied to a terminal, comprising:
receiving, from a network device, configuration information for a power saving mode, wherein the configuration information comprises one or more parameters corresponding to the power saving mode comprising a first power saving mode and a second power saving mode, and the configuration information comprises a first field, the first field corresponds to at least two first parameters in the one or more parameters,
wherein different values of the first field correspond to different groups of values for the at least two first parameters;
the at least two first parameters comprise at least one of:
a time gap between a physical downlink control channel (PDCCH) and a physical downlink shared channel (PDSCH) scheduled by the PDCCH; and
a time gap between a PDCCH and a physical uplink shared channel (PUSCH) scheduled by the PDCCH;
the maximum number of downlink multiple-input multiple-output (MIMO) layers;
the number of transmit antennas or transmit channels;
the number of receive antennas or receive channels;
uplink component carriers that are activated simultaneously;
downlink component carriers that are activated simultaneously;
a time gap between a PDSCH and an acknowledgment (ACK) or a negative acknowledgment (NACK);
a delay for PDSCH processing;
a delay for PUSCH preparation; and
the maximum number of uplink MIMO layers;
switching the terminal from the first power saving mode to the second power saving mode by using the one or more parameters comprised in the configuration information, in a case that scheduled information carried in a target PDCCH is not received within predetermined time in an active bandwidth part (BWP).

2. The method according to claim 1, wherein the switching the terminal from the first power saving mode to the second power saving mode is performed in a case that one or more of the following events occur:
that the terminal does not receive scheduled information carried in a PDCCH within predetermined time in radio resource control (RRC) connected state;
that a wake-up signal (WUS) is detected, wherein the WUS indicates that the terminal needs to monitor a physical downlink control channel (PDCCH) in a running period of a connected discontinuous reception (CDRX) on duration timer, wherein the WUS is received in the first power saving mode, and the WUS is associated with the PDCCH in the running period of the on duration timer;

that a connected discontinuous reception-inactivity timer CDRX-inactivity timer is started;

that the terminal receives a paging message associated with the terminal;

that a WUS received by the terminal indicates that the terminal needs to monitor a corresponding paging message, wherein the WUS is received in the first power saving mode, and the WUS is before a paging occasion (PO);

that a WUS received by the terminal indicates that the terminal needs to monitor a corresponding paging message, and a paging message received is associated with the terminal, wherein both the WUS and the paging message are received in the first power saving mode, and the WUS is before a paging occasion (PO);

that the terminal enters an idle state or an inactive state from an RRC connected state;

that the terminal enters an RRC connected state from an idle state or an inactive state;

that the terminal detects an initial signal from a new radio unlicensed (NRU) system;

that the terminal has transmitted information carried in a random access channel (RACH);

that the terminal determines to transmit information carried in a RACH;

that the terminal has transmitted a scheduling request (SR); or that the terminal determines to transmit an SR.

3. The method according to claim 1, wherein the first field comprises two bits, the values of the first field comprise 00, 01, 10, and 11, and each value of the first field corresponds to one of four different groups of values for the at least two first parameters.

4. The method according to claim 1, wherein the configuration information further comprises one or more of the following:

a second field, wherein the second field corresponds to at least two second parameters associated with the power saving mode of the terminal, wherein different values of the second field correspond to: different groups of values for the at least two first parameters and different power saving modes of the terminal; and a third field, wherein the third field comprises at least two bit strings corresponding to at least two third parameters, one of at least two bit strings corresponds to a corresponding one of the at least two third parameters, different states of one of at least two bit strings indicate different values of the corresponding one of the at least two third parameters, and the third parameter is associated with power consumption of the terminal.

5. The method according to claim 4, wherein the second parameter, or the third parameter further comprises one or more of the following:

a time gap between a physical downlink control channel (PDCCH) and a physical downlink shared channel (PDSCH) scheduled by the PDCCH;

a time gap between a PDCCH and a physical uplink shared channel (PUSCH) scheduled by the PDCCH;

the maximum number of downlink multiple-input multiple-output (MIMO) layers;

the number of transmit antennas or transmit channels;

the number of receive antennas or receive channels;

uplink component carriers that are activated simultaneously;

downlink component carriers that are activated simultaneously;

a time gap between a PDSCH and an acknowledgment (ACK) or a negative acknowledgment (NACK);

a delay for PDSCH processing;

a delay for PUSCH preparation; and the maximum number of uplink MIMO layers.

6. The method according to claim 5, wherein the first parameter, the second parameter, or the third parameter further comprises one or more of the following:

an identity ID of a BWP;

an index of a configured control resource set (CORESET);

an index of a configured search space;

a PDCCH monitoring periodicity;

a PDCCH monitoring offset;

PDCCH monitoring duration;

a maximum uplink transmission rate;

a maximum downlink transmission rate;

a discontinuous reception DRX cycle;

a bandwidth of a bandwidth part (BWP);

the number of channel state information (CSI) reports simultaneously processed by the terminal;

the number of beam management reports simultaneously processed by the terminal;

the number of measurement resources simultaneously received or processed by the terminal;

a delay associated with CSI report; and a delay associated with beam management report.

7. The method according to claim 1, wherein after the switching the terminal from the first power saving mode to the second power saving mode, the method further comprises:

reporting, to the network device, that the terminal has switched to the second power saving mode.

8. The method according to claim 1, further comprising:

skipping performing power saving mode switching on the terminal when an event for power saving mode switching does not occur.

9. The method according to claim 8, wherein the no occurrence of a power saving mode switching event comprises one or more of the following:

that no WUS is detected, wherein the WUS indicates that the terminal does not need to monitor PDCCH in a running period of a CDRX on duration timer, the WUS is received in the first power saving mode, and the WUS is associated with the PDCCH in the running period of the on duration timer;

that a CDRX-inactivity timer is not started;

that scheduled information carried in a target PDCCH is received within predetermined time in an active BWP;

that the terminal receives no paging message;

that the terminal receives a paging message not associated with the terminal;

that a WUS received by the terminal does not indicate the terminal to monitor a corresponding paging message;

that the terminal receives no WUS for indicating the terminal to monitor a corresponding paging message;

that a WUS received by the terminal indicates the terminal to monitor a corresponding paging message, but a paging message received is not associated with the terminal;

that the terminal is in an RRC connected state and receives scheduled information carried in a PDCCH within predetermined time;

that the terminal detects no initial signal from an NRU system;

that the terminal is not to transmit information carried in a RACH; or that the terminal is not to transmit an SR.

10. The method according to claim 1, wherein the configuration information further comprises a third field, the third field comprises three bit strings corresponding to three third parameters, wherein,
   a first bit string of the three bit strings comprises 4 bits, different states of the first bit string indicate different values of a first one of the three third parameters;
   a second bit string of the three bit strings comprises 5 bits, different states of the second bit string indicate different values of a second one of the three third parameters; and
   a third bit string of the three bit strings comprises 3 bits, different states of the third bit string indicate different values of a third one of the three third parameters.

11. A terminal, comprising a processor, a memory, and a program stored in the memory and capable of running on the processor, wherein when the program is executed by the processor, the method for power saving mode switching according to claim 1 is implemented.

12. The terminal according to claim 11, wherein the switching the terminal from the first power saving mode to the second power saving mode is performed in a case that one or more of the following events occur:
   that the terminal does not receive scheduled information carried in a PDCCH within predetermined time in radio resource control (RRC) connected state;
   that a wake-up signal (WUS) is detected, wherein the WUS indicates that the terminal needs to monitor a physical downlink control channel (PDCCH) in a running period of a connected discontinuous reception (CDRX) on duration timer, wherein the WUS is received in the first power saving mode, and the WUS is associated with the PDCCH in the running period of the on duration timer;
   that a connected discontinuous reception-inactivity timer CDRX-inactivity timer is started;
   that the terminal receives a paging message associated with the terminal;
   that a WUS received by the terminal indicates that the terminal needs to monitor a corresponding paging message, wherein the WUS is received in the first power saving mode, and the WUS is before a paging occasion (PO);
   that a WUS received by the terminal indicates that the terminal needs to monitor a corresponding paging message, and a paging message received is associated with the terminal, wherein both the WUS and the paging message are received in the first power saving mode, and the WUS is before a paging occasion (PO);
   that the terminal enters an idle state or an inactive state from an RRC connected state;
   that the terminal enters an RRC connected state from an idle state or an inactive state;
   that the terminal detects an initial signal from a new radio unlicensed (NRU) system;
   that the terminal has transmitted information carried in a random access channel (RACH);
   that the terminal determines to transmit information carried in a RACH;
   that the terminal has transmitted a scheduling request (SR); or
   that the terminal determines to transmit an SR.

13. The terminal according to claim 11, wherein the configuration information further comprises one or more of the following:
   a second field, wherein the second field corresponds to at least two second parameters associated with the power saving mode of the terminal, wherein different values of the second field correspond to: different groups of values for the at least two first parameters; and different power saving modes of the terminal; and
   a third field, wherein the third field comprises at least two bit strings corresponding to at least two third parameters, one of at least two bit strings corresponds to a corresponding one of the at least two third parameters, different states of one of at least two bit strings indicate different values of the corresponding one of the at least two third parameters, and the third parameter is associated with power consumption of the terminal.

14. The terminal according to claim 13, wherein the first field comprises two bits, the values of the first field comprise 00, 01, 10, and 11, and each value of the first field corresponds to one of four different groups of values for the at least two first parameters.

15. A method for power saving mode configuration, applied to a network device, comprising:
   transmitting configuration information for a power saving mode to a terminal, to cause the terminal to switch from a first power saving mode to a second power saving mode by using one or more parameters comprised in the configuration information in a case that scheduled information carried in a target PDCCH is not received within predetermined time in an active bandwidth part (BWP), wherein
   the configuration information comprises the one or more parameters corresponding to the power saving mode comprising the first power saving mode and the second power saving mode, and the configuration information comprises a first field, the first field corresponds to at least two first parameters in the one or more parameters,
   wherein different values of the first field correspond to different groups of values for the at least two first parameters;
   the at least two first parameters comprise at least one of:
      a time gap between a physical downlink control channel (PDCCH) and a physical downlink shared channel (PDSCH) scheduled by the PDCCH; and
      a time gap between a PDCCH and a physical uplink shared channel (PUSCH) scheduled by the PDCCH;
      the maximum number of downlink multiple-input multiple-output (MIMO) layers;
      the number of transmit antennas or transmit channels;
      the number of receive antennas or receive channels;
      uplink component carriers that are activated simultaneously;
      downlink component carriers that are activated simultaneously;
      a time gap between a PDSCH and an acknowledgment (ACK) or a negative acknowledgment (NACK);
      a delay for PDSCH processing;
      a delay for PUSCH preparation; and
      the maximum number of uplink MIMO layers.

16. The method according to claim 15, wherein the first field comprises two bits, the values of the first field comprise 00, 01, 10, and 11, and each value of the first field corresponds to one of four different groups of values for the at least two first parameters.

17. The method according to claim 15, wherein the configuration information further comprises one or more of the following:
- a second field, wherein the second field corresponds to at least two second parameters associated with the power saving mode of a terminal, wherein different values of the second field correspond to: different groups of values for the at least two first parameters; and different power saving modes of the terminal; and
- a third field, wherein the third field comprises at least two bit strings corresponding to at least two third parameters, one of at least two bit strings corresponds to a corresponding one of the at least two third parameters, different states of one of at least two bit strings indicate different values of the corresponding one of the at least two third parameters, and the third parameter is associated with power consumption of a terminal.

18. The method according to claim 17, the second parameter, or the third parameter comprises one or more of the following:
- a time gap between a PDCCH and a PDSCH scheduled by the PDCCH;
- a time gap between a PDCCH and a PUSCH scheduled by the PDCCH;
- the maximum number of downlink MIMO layers;
- the number of transmit antennas or transmit channels;
- the number of receive antennas or receive channels;
- uplink component carriers that are activated simultaneously;
- downlink component carriers that are activated simultaneously;
- a time gap between a PDSCH and an ACK or a NACK;
- a delay for PDSCH processing;
- a delay for PUSCH preparation; and
- the maximum number of uplink MIMO layers.

19. The method according to claim 18, wherein the first parameter, the second parameter, or the third parameter further comprises one or more of the following:
- an ID of a BWP;
- an index of a configured CORESET;
- an index of a configured search space;
- a PDCCH monitoring periodicity;
- a PDCCH monitoring offset;
- PDCCH monitoring duration;
- a maximum uplink transmission rate;
- a maximum downlink transmission rate;
- a discontinuous reception (DRX) cycle;
- a bandwidth of a BWP;
- the number of CSI reports simultaneously processed by the terminal;
- the number of beam management reports simultaneously processed by the terminal;
- the number of measurement resources simultaneously received or processed by the terminal;
- a delay associated with CSI report; and
- a delay associated with beam management report.

20. A method for power saving mode switching, performed by a terminal, comprising:
- receiving, from a network device, configuration information for power saving modes, wherein the configuration information comprises parameters corresponding to a first power saving mode and parameters corresponding to a second power saving mode, and the configuration information comprises a first field, the first field corresponds to a group of parameters for power saving modes,
- wherein different values of the first field correspond to different groups of values for the at least two first parameters;
- the at least two first parameters comprises at least one of:
  - a time gap between a physical downlink control channel (PDCCH) and a physical downlink shared channel (PDSCH) scheduled by the PDCCH; and
  - a time gap between a PDCCH and a physical uplink shared channel (PUSCH) scheduled by the PDCCH;
  - the maximum number of downlink multiple-input multiple-output (MIMO) layers;
  - the number of transmit antennas or transmit channels;
  - the number of receive antennas or receive channels;
  - uplink component carriers that are activated simultaneously;
  - downlink component carriers that are activated simultaneously;
  - a time gap between a PDSCH and an acknowledgment (ACK) or a negative acknowledgment (NACK);
  - a delay for PDSCH processing;
  - a delay for PUSCH preparation; and
  - the maximum number of uplink MIMO layers;
- switching the terminal from the first power saving mode to the second power saving mode by using the one or more parameters comprised in the configuration information, in response to determining that: a wake-up signal (WUS) received by the terminal indicates that the terminal needs to monitor a corresponding paging message, and a paging message received is associated with the terminal, both the WUS and the paging message are received in the first power saving mode, and the WUS is before a paging occasion (PO).

* * * * *